United States Patent [19]

Hall

[11] Patent Number: 4,476,678

[45] Date of Patent: Oct. 16, 1984

[54] CONTROL MECHANISM FOR PNEUMATIC APPARATUS

[75] Inventor: John L. Hall, Maidenhead, England

[73] Assignee: PLC Peters Limited, Middlesex, England

[21] Appl. No.: 229,149

[22] Filed: Jan. 28, 1981

[30] Foreign Application Priority Data

Jan. 31, 1980 [GB] United Kingdom ................. 8003238

[51] Int. Cl.[3] ....................... F15B 15/00; F15B 15/26; F16K 31/122

[52] U.S. Cl. ........................................ 60/404; 60/405; 60/428; 49/26; 49/118; 49/360; 91/5; 91/6; 91/32; 91/44; 91/45; 91/217; 251/14; 251/28

[58] Field of Search ..................... 91/44, 45, 217, 5, 6, 91/32; 60/404, 405, 428; 49/26, 28, 118, 360; 251/14, 25, 28

[56] References Cited

U.S. PATENT DOCUMENTS

| | | | |
|---|---|---|---|
| 844,659 | 2/1907 | Butler et al. | 49/118 |
| 1,285,100 | 11/1918 | Forman | 91/44 |
| 1,329,704 | 2/1920 | Forman | 91/32 |
| 1,807,231 | 5/1931 | Weeks | 49/118 |
| 2,366,587 | 1/1945 | Armington | 91/44 |
| 2,558,867 | 7/1951 | May et al. | 91/44 |
| 2,741,478 | 4/1956 | Mercier | 60/405 |
| 3,099,438 | 7/1963 | Fritz | 91/45 |
| 3,348,378 | 10/1967 | Lemley | 60/404 |
| 3,802,123 | 4/1974 | Frey et al. | 49/118 |
| 3,922,814 | 12/1975 | Runft | 49/28 |
| 4,065,094 | 12/1977 | Adams | 60/405 |
| 4,085,587 | 4/1978 | Garlinghouse | 60/404 |
| 4,087,939 | 5/1978 | Elguindy et al. | 49/118 |
| 4,091,570 | 5/1978 | Favrel | 49/118 |
| 4,140,152 | 2/1979 | Budzich | 137/596.2 |

FOREIGN PATENT DOCUMENTS

| | | |
|---|---|---|
| 1072518 | 6/1967 | United Kingdom . |
| 1170451 | 11/1969 | United Kingdom . |

*Primary Examiner*—George L. Walton

*Attorney, Agent, or Firm*—Buell, Blenko, Ziesenheim & Beck

[57] ABSTRACT

The control mechanism is for pneumatic apparatus of the kind comprising a piston-and-cylinder motor coupled between two relatively-movable parts (such as door-leaves) for driving them, when energized, to a predetermined relative position. A pilot valve is actuated when required to switch the apparatus to an emergency mode by isolating the motor from its power source and discharging it into an emergency reservoir having a volume large compared with the maximum volume of gas in the motor. While the pilot valve is actuated, the relatively-movable parts are urged towards their predetermined relative positions by a force small compared with the normal operating force. The pilot valve may be arranged to operate operation of an emergency release bolt, on obstruction detected by a detector valve (in which case a timing reservoir provides time delay before full power is restored), on power failure, or as required.

22 Claims, 7 Drawing Figures

CONTROL MECHANISM FOR PNEUMATIC APPARATUS

Figure 1:
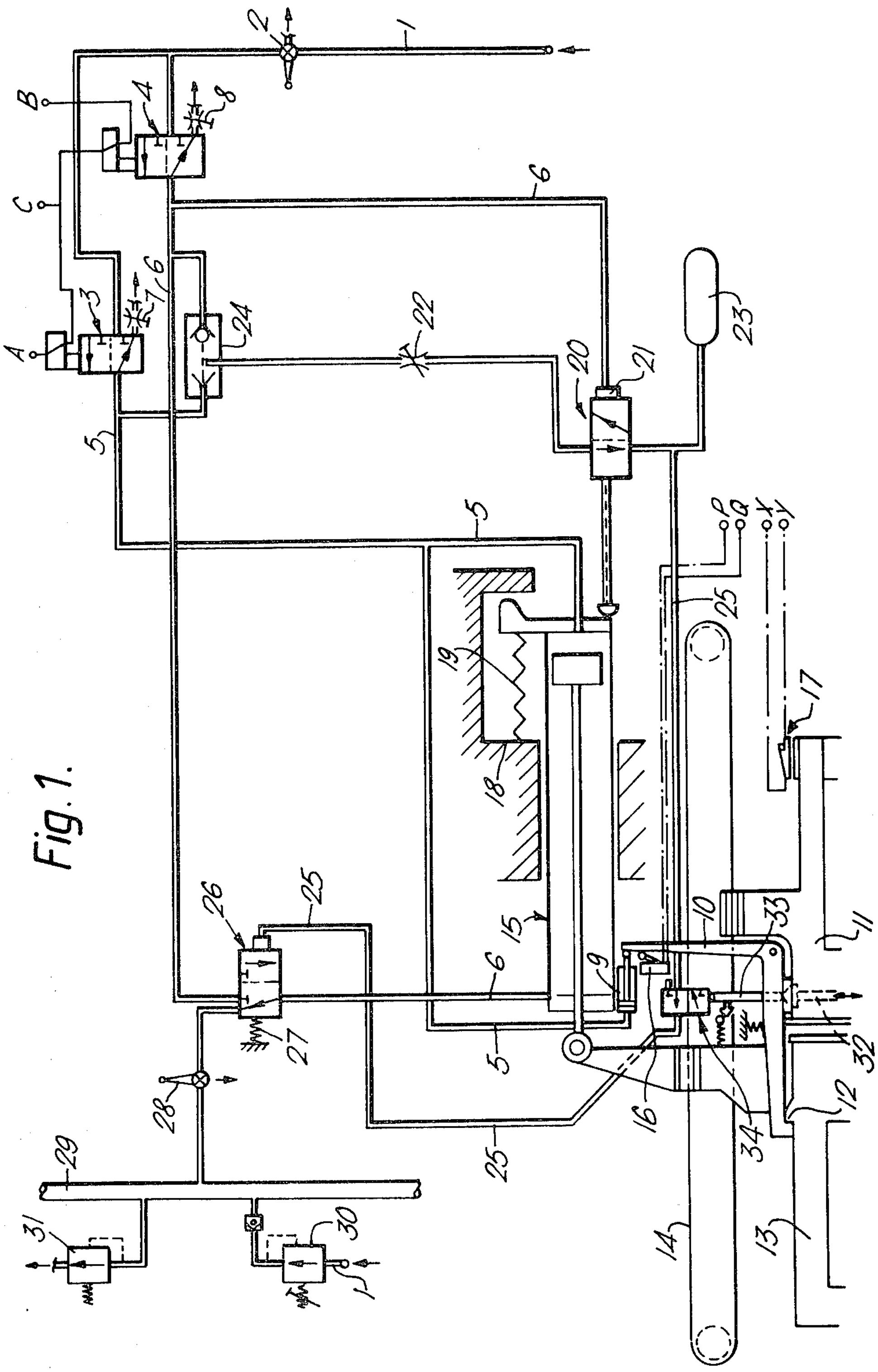

This invention relates to control mechanisms for ensuring safe and effective operation of pneumatic apparatus that must bring moving parts to a pre-determined position before related apparatus can be operated.

One major application of the invention is in control mechanisms for pneumatically-operated doors that must be securely closed prior to such operations as movement of a lift or a vehicle, the starting of dangerous machinery, exposure of radiation sources, the opening of doors in a security system, or the like.

Such apparatus often requires the provision of manual over-ride control; furthermore it is liable to malfunction due to human error, interference and congestion, as well as temporary power failure and (especially in complex systems) it is desirable to ensure as far as possible that the apparatus will always come to its predetermined position, even under power failure, on restoration to automatic operation, or on removal of interference or other cause that has prevented it from doing so, and which at the same time will not apply excessive forces to a person or object that may obstruct the required movement. Especially when a large group of apparatuses are associated together (for example all the landing doors of a lift or the doors of a train), reliability of operation is very desirable; and the requirement for operation during interruption of power supply militates against the use of electronic circuits because their standby power sources would not meet the required standard of reliability.

British Pat. No. 1170451 describes a control mechanism for doors or other pneumatic apparatus in which the existence of an obstruction is detected by and utilised to reverse the movement of the door or other mechanism; on reaching the limit of reverse movement it either resumes the original movement under full power (leading to oscillation if the obstruction persists) or else comes to rest. The first arrangement is obviously undesirable, especially when the obstruction subjected to repeated impacts may be an elderly person or a child but more generally because of the energy wasted, and the second requires manual intervention to restore normal operation. Moreover neither arrangement provides for operation under power-failure conditions.

In accordance with the invention, a control mechanism for pneumatic apparatus comprising a piston-and-cylinder motor coupled between two relatively-movable parts and means for supplying high-pressure air to the motor to drive the said parts to pre-determined relative position is characterised by a pilot valve which when actuated switches the apparatus to an emergency mode by isolating the motor from its power source and discharging it into a second or emergency reservoir having a volume large compared with the maximum volume of gas in the motor: whereby during pilot valve the relatively-movable parts will be urged towards their predetermined relative positions by a force small compared with the normal operating force, and when actuation of the pilot valve ceases the normal operating force is restored.

The pilot valve may be operated in any manner appropriate to the event of circumstances that require emergency operation; for example it may be operated by direct mechanical coupling to the emergency opening handle of a door and/or may be made to respond to loss of air pressure by biassing it towards an actuated position and normally holding it in its non-actuated position by a pneumatic servomotor operated from the main air supply.

In a development of the invention, however, when the occurrence of an obstruction is detected in any appropriate manner the pilot valve is actuated, and the system placed in emergency mode, for a predetermined period. In this form of the invention, a detector valve is operated on detection of an obstruction to discharge a timing reservoir that is normally charged with gas under pressure through a constricted passage, and the pressure in the timing reservoir is utilised to hold the pilot valve against a biassing force in its non-actuated position. (The use of a timing reservoir in such a manner is known per se, for example from Forman U.S. Pat. No. 1,329,704).

A preferred mechanism for obstruction detection (known per se, see for example the British Patent referred to above) is one in which the motor is coupled to one of the relatively-movable parts through a preloaded resilient member (such as a compression spring) that will be reversibly deformed if the force applied between the relatively-movable parts exceeds a value corresponding to its loading, the detector valve being coupled to the resilient member so as to operate when such deformation occurs. The pre-loading of the resilient member should be such that deformation, and so switching to the emergency mode, will only occur if movement of the parts to their predetermined relative position is obstructed; and if the movement is still obstructed when the normal operating force is restored, the mechanism will promptly operate again to restore emergency mode for a further period.

Preferably the emergency reservoir is pre-filled with gas at a relatively low pressure, preferably by a source that is continuously available, such as a pressure-reducer supplied from the main compressed-gas source; and preferably it is fitted with a relief valve to limit the pressure-rise that can be produced by the discharge into it of gas from the motor. Normally it will be preferable for the size and pre-filling pressure (if any) of the emergency reservoir to be such that in the emergency mode relatively-movable parts can be pushed back by hand against the relatively-small force then being applied by the motor.

Preferably the detector valve, when actuated, also disconnects the timing reservoir from its pressurising source so that if and so long as the detector valve remains actuated, the emergency mode will be held; and preferably the pressurising source is, or is derived from, the gas source for the motor, so that the apparatus will, without any additional mechanism whatever, switch automatically to the emergency mode in the event of failure of pneumatic power (or of electrical or other controls making that power available).

When the motor is double-acting, it is normally preferable to ensure that switching to the emergency mode cannot occur during actuation of the motor in a direction to move the parts away from the predetermined position referred to above, and for this purpose the detector valve is preferably operated by a biassing force applied only while the motor is actuated in the direction tending to move the parts towards that predetermined position; for example, in the preferred form of the apparatus a pneumatic servomotor may be connected to the appropriate side of the motor cylinder (or to the duct supplying it), and urging the actuating-member of the detector valve into engagement with an abutment on the cylinder (or piston, depending on the location of the resilient member) in such a way that the valve will remain stationary in the absence of a biassing force, even if the cylinder (or piston) should move.

The invention may be further developed by providing for switching to emergency mode in response to other events. This may entail provision of an additional actuating member for the detector valve and/or the pilot valve, or of additional valves, or both, and the event causing switching may be the temporary or sustained presence, or absence, of a signal derived from a manual or automatic signalling device.

If a time-interval is required after termination or cancellation of the event causing switching and before the apparatus is returned to its normal mode, it is preferable for the detector valve to be actuated; but if no such time-delay is required, we prefer to insert an auxiliary valve controlling the supply of air to the pilot valve (for instance in the line between the timing reservoir and the pilot valve), the auxiliary valve providing a direct connection in normal operation and when actuated occluding the passage from the air supply and venting the passage to the pilot valve.

Figure 2A:
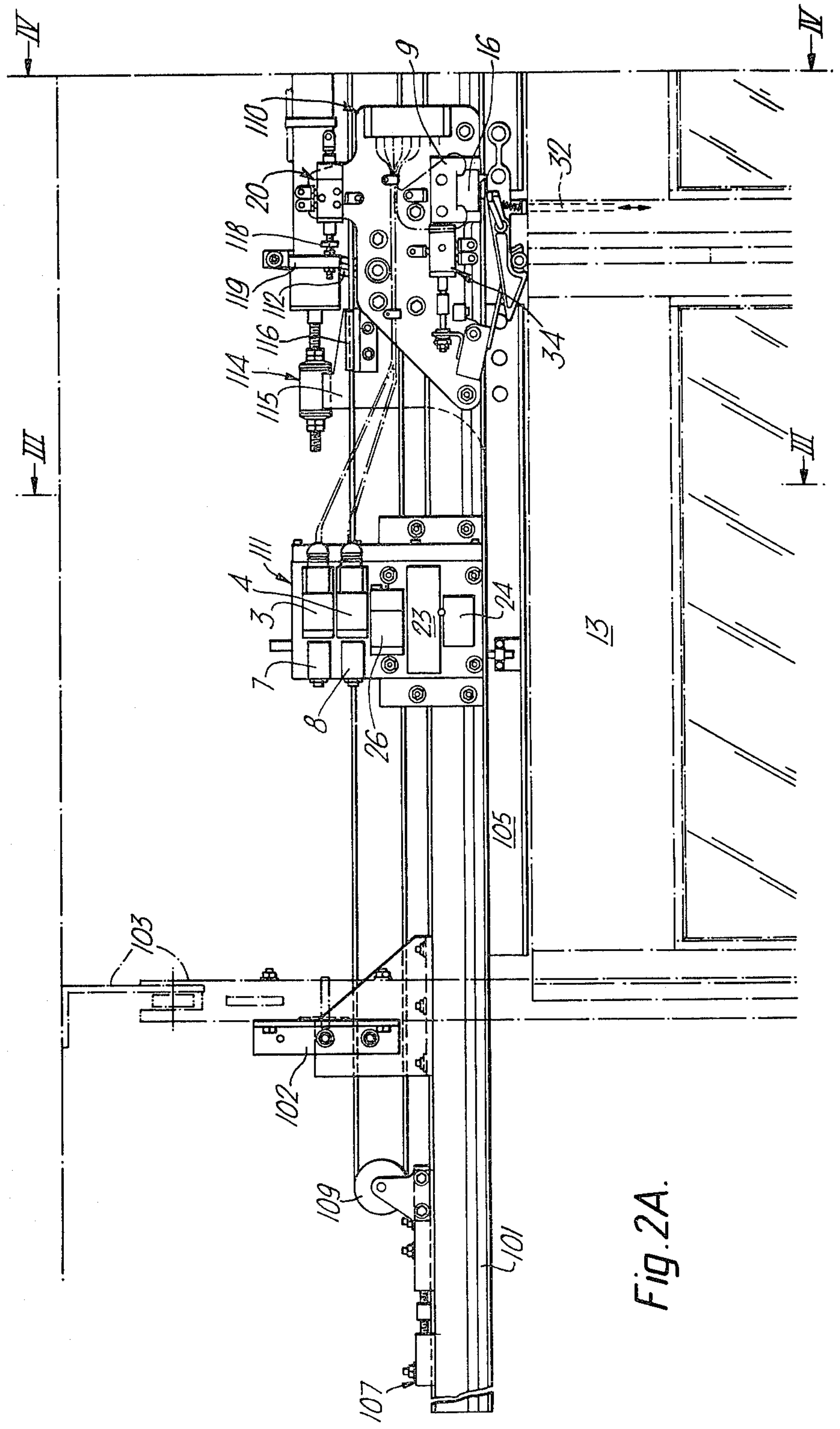
Figure 2B:
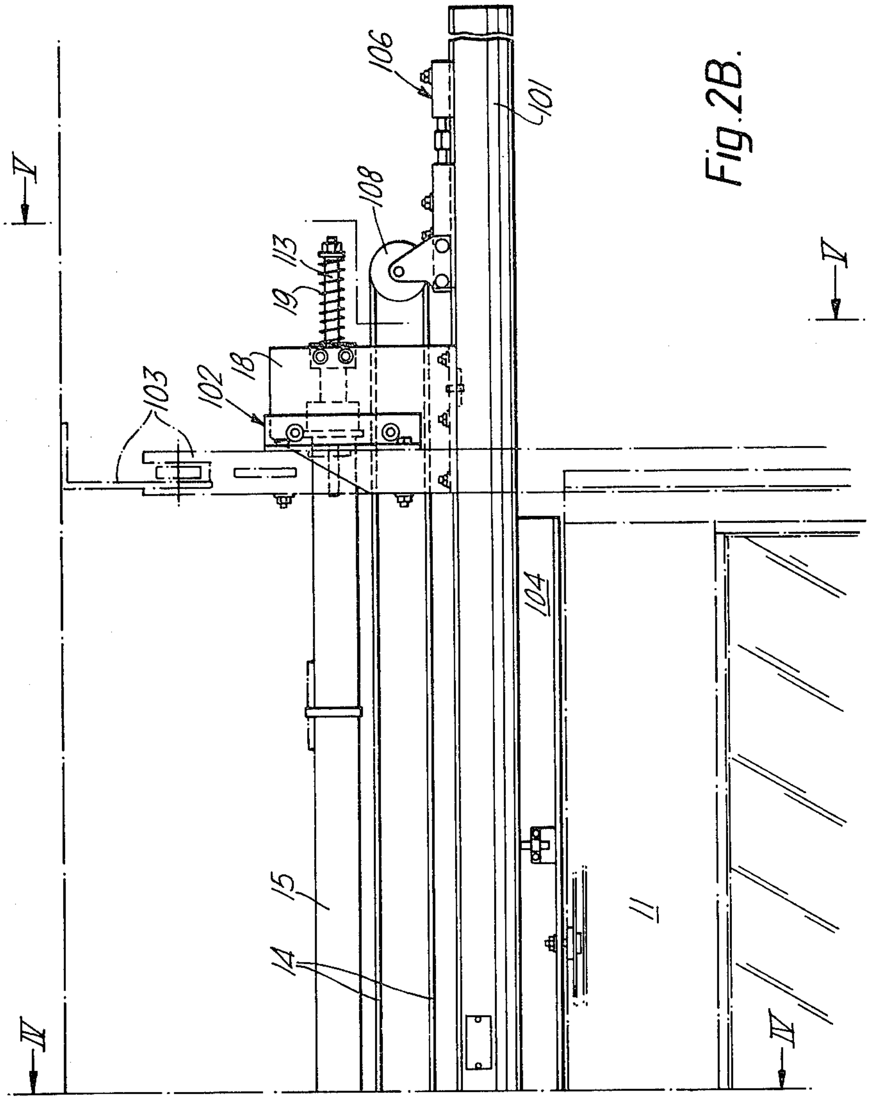
Figure 3:
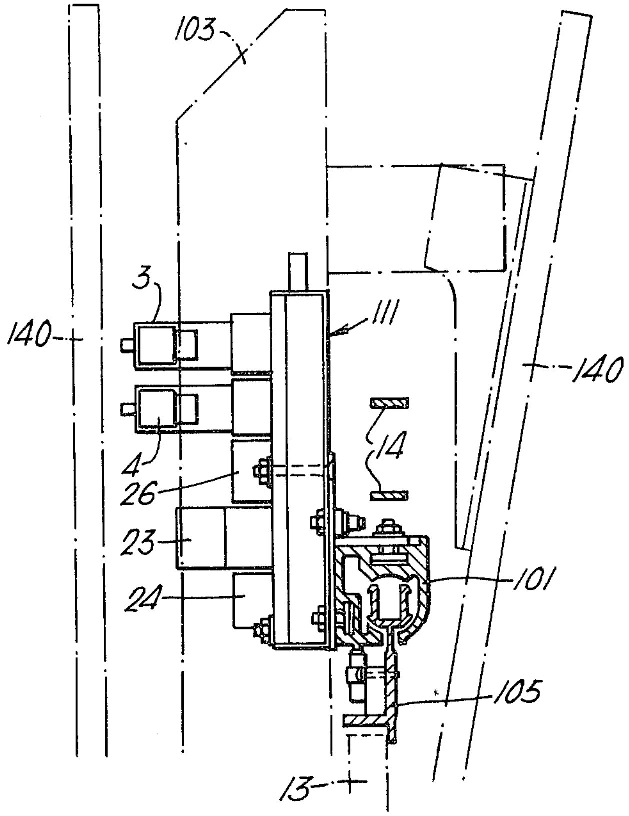
Figure 4:
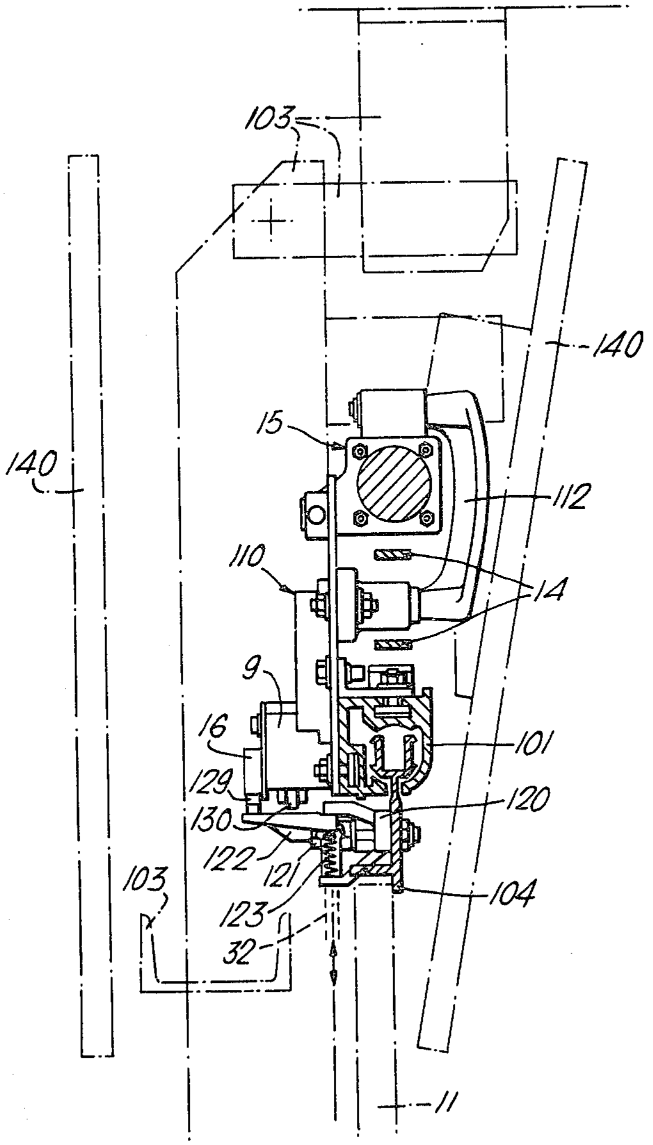
Figure 5:
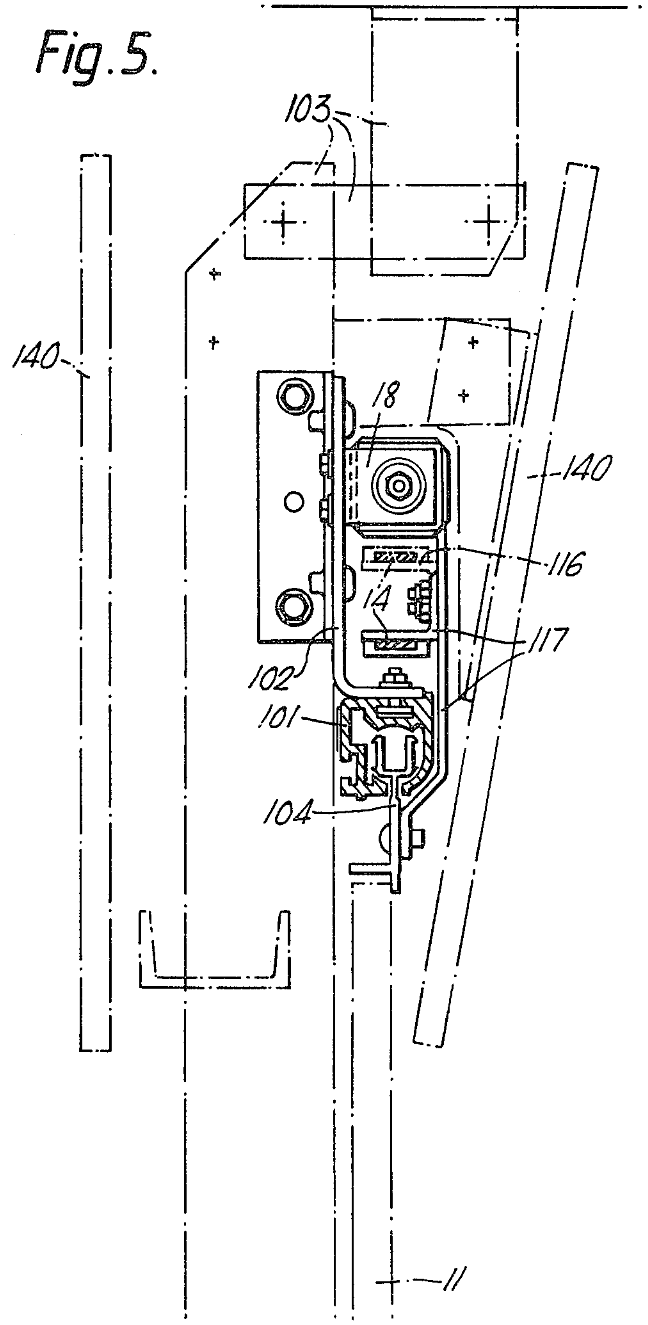
Figure 6:
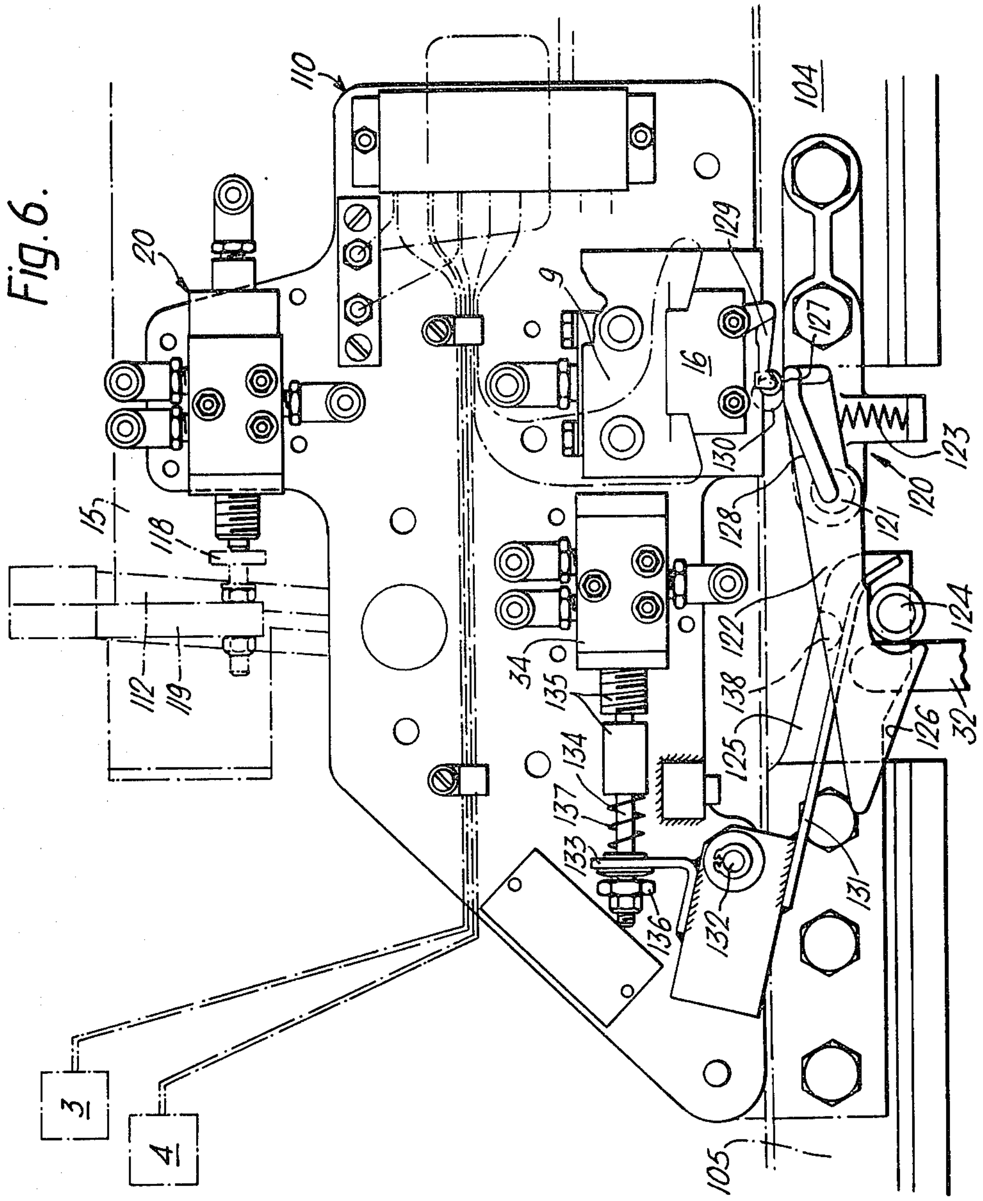

The invention will be further described, by way of example, with reference to the accompanying drawings in which:

FIG. 1 is a pneumatic circuit diagram of a control system for a sliding door suitable for a lift, a train or the like;

FIGS. 2A and 2B together form a front elevation of one specific form of door-operating mechanism;

FIGS. 3, 4 and 5 are enlarged cross-sections on the lines III—III, IV—IV and V—V respectively in FIGS. 2A and/or 2B; and FIG. 6 is an enlarged detail from FIG. 2A.

The principles of the invention will be described first with reference to the circuit-diagram of FIG. 1 and starting with the normal mode of operation.

Compressed air from any convenient source (not shown) is fed by a duct 1 and isolating valve 2 to the input side of two electromagnetic valves, namely an 'opening' valve 3 and a 'closing' valve 4. These valves are of identical construction and each connects its respective output duct 5, 6 to the duct 1 when actuated and to an adjustable constriction 7, 8 leading to the atmosphere when not actuated. Control signals are applied to terminals A, B, C in such a way that normally either the opening valve or the closing valve is actuated at any particular time.

When the opening valve is actuated, air is supplied to an auxiliary pneumatic motor 9 which operates a latch 10, pivoted on the sliding door-leaf 11, to release it from an abutment 12. (As shown, this is on a second door-leaf 13 coupled to the first door-leaf 11 by a coupling belt 14, but it could equally well be fixed to the jamb of a single sliding door); air is also supplied to the right of the piston in a main pneumatic motor 15 that slides the door-leaf (or leaves) in the opening direction. Exhaust air from the left of the cylinder is discharged through the duct 6, the closing valve 4 (which has simultaneously ceased to be actuated) and the constriction 8 to the atmosphere; the setting of the constriction 8 controls the opening speed of the door. The difference in size of the motors 9 and 15 is sufficient to ensure that the latch is released before the door-leaf moves, and on reaching the 'open' limit of movement the door is held by maintenance of pressure in the motor.

On command to close, the closing valve 4 is actuated and supplies air via duct 6 to the left-hand side of the main motor 15 and at the same time the opening valve 3 ceases to be actuated, and thereby exhausts air from the right-hand side of the main motor, as well as from the auxiliary motor 9, to atmosphere through the constriction 7, which thereby controls the closing speed of the door or doors.

Conventional damping means may be provided to control the approach to the open and closed positions, for example by designing the piston so that it slowly occludes the discharge from the motor.

A detector 16 provides a signal at the contacts P, Q when the door and the latch are in a closed and locked position. In the case of double doors it may be advisable to provide a further detector 17 providing a signal at contacts X, Y to ensure that the door-leaf 13 is also in correct position, since the detector 16 could be actuated with the other door open if the belt 14 were broken. The detector 17 need give only a rough indication of closure, as the latch will be displaced if the door-leaf 13 is only slightly short of its fully-closed position, and accordingly a magnetic reed-switch is an adequate detector.

The cylinder of the main motor 15 is supported against a fixed abutment 18 by a spring 19 pre-compressed to an appropriate force (say 200 N or 20 kg weight). So long as the applied force on the door-leaf, and consequently the reaction force on the cylinder, remains below this force, the cylinder remains stationary. If however this force is exceeded during closing, due to an obstruction to the movement of the door-leaf towards its closed position, the cylinder compresses the spring 19 and moves to the left. This movement is followed, in accordance with the invention, by a detector valve 20 biassed into engagement with the servomotor 21 preferably connected (as shown) to the duct 6 so as to operate only when the closing valve 4 is actuated.

This detector valve 20 controls the supply of compressed air through an adjustable constriction 22 to a timing reservoir 23. Preferably this air is supplied, through an 'OR' logic gate 24, from whichever of the ducts 5, 6 is pressurised (it could be supplied directly from the line 1 or from an independent source, but the system would not then switch to emergency mode as an automatic result of failure of the opening or closing valve, as described below). While timing reservoir 23 is at normal working pressure, it provides control pressure through duct 25 to a pilot valve 26 inserted in the duct 6 and thereby holds that valve against a biassing spring 27 in a position that does not interrupt the duct 6. When the detector valve 20 is actuated however, it exhausts the timing reservoir 23 rapidly to atmosphere, thereby depressuring duct 25 and allowing the pilot valve 26 to be actuated by the spring 27 so as to interrupt the duct 6 and connect the side of the duct that leads to the motor 1 through an isolation valve 28 to a tubular low-pressure emergency reservoir 29. This emergency reservoir is pre-pressurised from a branch (not shown in full) of the duct 1 through a pressure reducer 30 and fitted with a relief valve 31 set so that the pressure in the emergency reservoir is maintained in a range low compared with the supply pressure, the low end of the range being determined by the pressure reducer 30 and the high end by the relief valve 31. (In one practical system, the supply pressure is 5 bar ($0.5MN/m^2$), the minimum pressure in the emergency reservoir is 0.5 bar ($0.05MN/m^2$).

The system will remain in this emergency mode, with the motor 15 connected to the low-pressure emergency reservoir and thereby acting as a light pneumatic spring so that the door can be opened manually but will re-close automatically, during the normally brief period that the detector valve remains actuated, and thereafter for the time taken to re-pressurise the first reservoir 23 sufficiently to actuate the pilot valve 26; this waiting time can be varied by adjusting the constriction 22.

In the event of failure of the main compressed-air supply, or of the actuated valve 3 or 4, no air will be supplied to the timing reservoir 23 which will rapidly lose pressure and thereby operate the pilot valve 26 to switch the system to the emergency mode.

The system of the example is switched to emergency mode also upon actuation of a manual door release which raises a bolt 32 in a known way to release the latch 10. The bolt 32 simultaneously actuates a link 33 to operate a further valve 34 interposed in the duct 25, thereby exhausting the pilot valve direct to the atmosphere without discharging the first reservoir 23. This further valve 34 remains in the actuated position (a bi-stable mechanism can be used if necessary, but usually friction will be sufficient) until re-set by an engagement (not shown in this figure) with the latch 10 when the door is again closed and locked, when the system reverts from emergency mode to normal mode without delay.

FIGS. 2 to 6 show, by way of illustration only since the principles of the invention can be applied to many conventional designs without difficulty, mechanical features of a particular door-operating mechanism in accordance with the invention.

The main structural support of the mechanism is an extruded aluminium alloy rail 101 mounted in a horizontal position above the door opening and supported by brackets 102 on any suitable structural members 103 of the building or other structure. Each of the door-leaves 11, 13 is adjustably suspended from a respective trolley 104, 105 extruded from the same material and running on wheels (not shown) in the rail 101. Also mounted on the rail 101, but in fixed positions, are: supports 106, 107 for pulleys 108, 109 that support the endless coupling belt 14; a lock sub-assembly 110 (enlarged in FIG. 6); and a logic sub-assembly 111.

The cylinder of the main motor 15 is supported at the left-hand end (as seen in FIG. 2A) by a lever 112 pivoted on it and on the lock sub-assembly 110, so allowing limited movement in a substantially horizontal direction; at its right-hand end (FIG. 2B) it has an extension 113 that slides in an opening provided in the bracket 102: the pre-loaded spring 19 normally holds the cylinder at the right-hand end of its range of travel.

The piston of the main motor is rigidly coupled through an adjusting nut assembly 114 to a bracket 115 on the hanger 105 of the left-hand door-leaf 13, and so actuates that leaf directly; this bracket is also clamped at 116 to the upper run of the coupling belt 14, and the other door-leaf is actuated through this belt and a bracket 117 (only visible in FIG. 5) corresponding to the bracket 115 but clamped to the lower run of the belt 14. Thus the two door-leaves are operable by the one main motor and constrained to move equally in opposite directions.

To reduce the length of pneumatic ducting required, the detector valve 20 is located near the left-hand end of the cylinder, on the lock sub-assembly 110 where it is actuated by an adjustable stud 118 mounted in a lug 119 on the cylinder.

The logic sub-assembly 111 incorporates the solenoid valves 3, 4 with their flow restrictors 7, 8, the reservoir 23, OR gate 24, and pilot valve 26.

In addition to the detector valve 20 already referred to, the lock sub-assembly (FIGS. 6 and 4) supports the auxilliary motor 9, detector 16 and the further valve 34 together with parts of its operating mechanism. Each of these co-operates with an interlocking mechanism comprising parts on the adjacent ends of the trolleys 104, 105 of the two door-leaves.

To the trolley 104 is bolted a cast bracket 120 which provides a pivot 121 for a pawl 122 (corresponding in function to the latch 10 of FIG. 1) and a spring 123 for biassing it in an anti-clockwise direction as seen in FIG. 6. The prime function of the pawl is to lock the doors; and for this purpose it co-operates with a rubber-covered peg 124 (corresponding in function to the abutment 12 in FIG. 1) supported by a bracket 125 bolted to the trolley 105. During closing movement, a camming surface 126 on the pawl first engages the peg 124 to lift the pawl against the action of the biassing spring 123 (and gravity) which then bring it to the locked position shown.

At the right-hand end of the pawl is a bearing surface 127 associated with a ramp 128. One part of the bearing surface 127 engages a lever 129, which operates the detector (microswitch) 16 to give the required electrical signal when and only when the doors are closed and the pawl 122 engaged with the peg 124. Another part of the same bearing surface 127 is engaged by the operating member 130 of the motor 9 to operate the pawl against the biassing spring 123 to unlock the doors.

The mechanism (fulfilling the function of link 33 in FIG. 1) for operating the further valve 34 includes a curved bell-crank lever 131 which is pivotted at 132 on the fixed locking assembly. The upper limb 133 of this lever has a clearance hole through which the operating rod 134 of the valve passes, and is trapped between a fixed stop 135 and an adjustable stop 136 both mounted on the rod. A spring 137 urges the limb 133 towards the adjustable stop 136, the object of this arrangement being to provide a controlled lost-motion at the right-hand end of the travel of the rod 134. A projection 138 on the pawl 122 engages the lower limb of the bell-crank lever 131 when in the locked position, so urging the lever in a clockwise direction against the spring 137, ensuring that the valve is in its normal (that is its right-hand position and creating a small clearance between the limb 133 and the stop 136. On operation of the manual door release, the bolt 32 rises and engages the lever 131 to lift it. This immediately lifts the pawl 122 through the engagement of the lever with projection 138, and the lost motion in the valve actuation mechanism is such that the actuation of the valve coincides with the arrival of the pawl in a position that disengages the pawl from the peg 124 and so unlocks the doors.

The pneumatic connections and operation of the mechanism of FIGS. 2 to 6 are exactly as described above with reference to FIG. 1.

The mechanism is preferably concealed and protected by housing members 140.

I claim:

1. A control mechanism for pneumatic apparatus having a piston-and-cylinder motor coupled between two relatively-movable parts, said motor having an actuating chamber, and means for supplying high-pressure air to the actuating chamber to drive the said parts to a predetermined relative position, the control mechanism comprising a pilot valve coupled between said supply means and said actuating chamber and allowing flow of high-pressure air to said actuating chamber in a normal mode of operation, an emergency reservoir having a volume large compared with the maximum volume of gas in the motor, means for actuating said pilot valve to an emergency mode in which it isolates the actuating chamber from said supply means and connects it to the emergency reservoir, whereby the pressure in the actuating chamber falls to a value such that the relatively-movable parts are urged towards the predetermined relative position by a lower force which can be overcome when the parts are moved by external means, said mechanism having a source of gas under pressure, a timing reservoir normally charged with gas under pressure from said source through a constricted passage to maintain therein a pressure connected to said pilot valve to hold the pilot valve against a biasing force in its non-actuated position, and a detector valve, being engaged and moved by the motor upon detection of an obstruction to movement of the motor to discharge the timing reservoir to move the relatively movable parts to a predetermined relative position.

2. A control mechanism in accordance with claim 1 characterized by the insertion of an auxiliary valve controlling the supply of air to the pilot valve, the auxiliary valve providing a direct connection in normal operation and when actuated occluding the passage from the air supply and venting the passage to the pilot valve.

3. A control mechanism in accordance with claim 1 wherein the emergency reservoir is pre-filled with gas at a relatively low pressure.

4. A control mechanism in accordance with claim 3 wherein the emergency reservoir is supplied with gas by a source that is continuously available.

5. A control mechanism in accordance with claim 1 or 3 or 4 characterised in that the detector valve, when actuated, also disconnects the timing reservoir from its pressurising source.

6. A control mechanism in accordance with claim 1 or 3 or 4 or claim 5 in which the motor is coupled to one of the relatively-movable parts through a pre-loaded resilient member that will be reversible deformed if the force applied between the relatively-movable parts exceeds a value corresponding to its loading, characterised in that the detector valve is coupled to the resilient member so as to operate when such deformation occurs.

7. A control mechanism in accordance with claim 5 in which the motor is coupled to one of the relatively-movable parts through a pre-loaded resilient member that will be reversible deformed if the force applied between the relatively-movable parts exceeds a value corresponding to its loading, characterized in that the detector valve is coupled to the resilient member so as to operate when such deformation occurs.

8. A control mechanism in accordance with claim 5 characterized by the insertion of an auxiliary valve controlling the supply of air to the pilot valve, the auxiliary valve providing a direct connection in normal operation and when actuated occluding the passage from the air supply and venting the passage to the pilot valve.

9. A control mechanism in accordance with claim 6 characterized by the insertion of an auxiliary valve controlling the supply of air to the pilot valve, the auxiliary valve providing a direct connection in normal operation and when actuated occluding the passage from the air supply and venting the passage to the pilot valve.

10. A control mechanism as claimed in claim 2 wherein the emergency reservoir is prefilled with gas at a relatively low pressure.

11. A control mechanism as claimed in claim 2 wherein the emergency reservoir is supplied with gas by a source that is continuously available.

12. A control mechanism as claimed in claim 8 wherein the emergency reservoir is prefilled with gas at a relatively low pressure.

13. A control mechanism as claimed in claim 8 wherein the emergency reservoir is supplied with gas by a source that is continuously available.

14. A control mechanism as claimed in claim 9 wherein the emergency reservoir is prefilled with gas at a relatively low pressure.

15. A control mechanism as claimed in claim 9 wherein the emergency reservoir is supplied with gas by a source that is continuously available.

16. A pneumatically-operated door assembly control mechanism comprising a double-acting piston-and-cylinder motor, said motor having an actuating chamber, means for supplying high-pressure air to said actuating chamber to close the door assembly, a pilot valve disposed between said supply means and said actuating chamber, said pilot valve having a normal position in which said supply means is connected to said actuating chamber through said pilot valve and having a second position in which said actuating chamber is isolated from the supply means, said assembly further comprising a low-pressure emergency reservoir having a volume large compared with the maximum volume of the actuating chamber, flow means connecting said emergency reservoir to said pilot valve and actuating means responsive to the occurrence of an emergency condition to actuate said pilot valve from the normal position to the second position, said pilot valve being constructed to isolate said actuating chamber from said reservoir in the normal position thereof but in the second position thereof to connect said actuating chamber to said emergency reservoir whereby the pressure in the actuating chamber will fall to a value such that the door assembly is urged towards the closed condition by a lower force which can be overcome by a person wishing to open the door assembly said mechanism having a source of gas under pressure, a detector reservoir normally charged with gas under pressure from said source through a constricted passage to maintain therein a pressure connected to said pilot valve to hold the pilot valve against a biasing force in its non-actuated position, and detector valve means being engaged and moved by the motor upon an obstruction being detected between the relatively movable parts, so that the gas from the detector reservoir can be supplied to the control mechanism to move the door assembly toward a predetermined position.

17. A control mechanism in accordance with claim 16 characterised in that the emergency reservoir is prefilled with gas at a relatively low pressure.

18. A control mechanism in accordance with claim 17 characterised in that the emergency reservoir is supplied with gas by a source that is continuously available.

19. A control mechanism in accordance with any one of claims 16 or 2 or 3 characterised in that the emergency reservoir is fitted with a relief valve.

20. A control mechanism in accordance with claim 19 characterized by the insertion of an auxiliary valve controlling the supply of air to the pilot valve, the auxiliary valve providing a direct connection in normal operation and when actuated occluding the passage from the air supply and venting the passage to the pilot valve.

21. A control mechanism in accordance with any one of claims 16 or 2 or 3 characterised by the insertion of an auxiliary valve controlling the supply of air to the pilot valve, the auxiliary valve providing a direct connection in normal operation and when actuated occluding the passage from the air supply and venting the passage to the pilot valve.

22. A control mechanism as in any one of claims 16 or 2 or 3 wherein the two relatively movable parts are doors.

* * * * *

UNITED STATES PATENT AND TRADEMARK OFFICE

CERTIFICATE OF CORRECTION

PATENT NO. : 4,476,678

DATED : October 16, 1984

INVENTOR(S) : JOHN LEWIS HALL

It is certified that error appears in the above-identified patent and that said Letters Patent is hereby corrected as shown below:

Column 1, line 65, change "of" to --or--.

Claim 16, line 46, after assembly, insert --,--.

Signed and Sealed this

*Twenty-fifth* Day of *June 1985*

[SEAL]

*Attest:*

DONALD J. QUIGG

*Attesting Officer* *Acting Commissioner of Patents and Trademarks*